United States Patent
Methaniya et al.

(10) Patent No.: US 11,182,604 B1
(45) Date of Patent: Nov. 23, 2021

(54) COMPUTERIZED RECOGNITION AND EXTRACTION OF TABLES IN DIGITIZED DOCUMENTS

(71) Applicant: Automation Anywhere, Inc., San Jose, CA (US)

(72) Inventors: Mukesh Methaniya, Vadodara (IN); Yogesh Savalia, Vadodara (IN); Nakuldev Patel, Vadodara (IN); Priti Sundar Hazra, Vadodara (IN); Derek S. Chan, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 197 days.

(21) Appl. No.: 16/697,048

(22) Filed: Nov. 26, 2019

(51) Int. Cl.
*G06K 9/00* (2006.01)

(52) U.S. Cl.
CPC ..... *G06K 9/00449* (2013.01); *G06K 9/00469* (2013.01)

(58) Field of Classification Search
None
See application file for complete search history.

(56) References Cited

U.S. PATENT DOCUMENTS

| | | | | |
|---|---|---|---|---|
| 10,067,931 | B2* | 9/2018 | Desai | G06F 40/205 |
| 10,395,772 | B1* | 8/2019 | Lucas | G16H 10/60 |
| 10,592,184 | B2* | 3/2020 | Yu | G06K 9/00449 |
| 10,679,049 | B2* | 6/2020 | Bellert | G06K 9/00449 |
| 10,706,228 | B2* | 7/2020 | Buisson | G06F 40/163 |
| 10,817,717 | B2* | 10/2020 | Yu | G06K 9/00463 |
| 10,846,524 | B2* | 11/2020 | Price | G06N 3/08 |
| 10,846,525 | B2* | 11/2020 | Gurav | G06K 9/6256 |
| 2007/0174482 | A1* | 7/2007 | Yajima | G06F 40/18 709/238 |
| 2009/0313245 | A1* | 12/2009 | Weyl | G06F 16/5846 |
| 2011/0255789 | A1 | 10/2011 | Neogi et al. | |
| 2012/0177290 | A1* | 7/2012 | Le Glaunec | G06K 9/00449 382/176 |

(Continued)

OTHER PUBLICATIONS

K. Simonyan, A. Zisserman, Very Deep Convolutional Networks for Large-Scale Image Recognition, Visual Geometry Group, Department of Engineering Science, University of Oxford, arXiv: 1409.1556v6 [cs.CV] Apr. 10, 2015.

(Continued)

*Primary Examiner* — Anand P Bhatnagar

(57) ABSTRACT

Information contained in tables in a digitized document is extracted by retrieving table layout data regarding bounding boxes, each being auto-generated by the system and/or (re)generated by a user to the digitized image of a sample document. A row template is used to identify a first table, by automatically scanning within the document. Upon detecting a possible row in the input image, a Row Possibility Confidence Value (RPCV) is generated that indicates a likelihood that the possible row corresponds to an actual row in the first table. The possible row is regarded as an actual row if the RPCV exceeds a predetermined threshold value. For repeated tables in a document only the first table needs to be identified via bounding boxes. Also, related tables can be linked to permit linked data to be extracted to a structured file. Also, only the primary column in a readable and existent table header is required to extract table values across columns.

20 Claims, 17 Drawing Sheets

(56) References Cited

U.S. PATENT DOCUMENTS

2017/0286803 A1    10/2017  Singh et al.
2019/0266394 A1*    8/2019  Yu ..................... G06K 9/00449
2020/0151444 A1*    5/2020  Price ................... G06K 9/6277

OTHER PUBLICATIONS

Min Lin, Qiang Chen, Shuicheng Yan, Network In Network, Graduate School for Integrative Sciences and Engineering, Department of Electronic & Computer Engineering, National University of Singapore, Singapore, arXiv:1312.4400v3 [cs.NE] Mar. 4, 2014.

* cited by examiner

202 {
Patient Name: Irrfan Khan
Member ID: IQ_Bot0001
Date of Birth: 07 Jan 1967
Provider Name: Cognitive
Gender:
● Male  ○ Female  ○ Other 204 {
Patient Account No: AASPL_3100
Claim ID: Cognitive_123XXX
Claim Status: PAID 205 {
Type of payment:
☐ Cash  ☐ Cheque  ☒ Bank Account

206 {

| Line | Date of service | Rev Code | Units | Billed Amount | Allowed Amount | Discount /Penalty | Net Amount |
|---|---|---|---|---|---|---|---|
| 1 | 02/02/18 | 0211 | 1 | 100.00 | 100.00 | 0.00 | 100.00 |
| 2 | 03/02/18 | 0221 | 5 | 500.00 | 500.00 | 0.00 | 500.00 |
| 3 | 03/02/18 | 0200 | 3 | 300.00 | 300.00 | 0.00 | 300.00 |

208 { Claim Totals | 9 | 900.00 | 900.00 | 0.00 | 900.00

Payment Mode (If Bank Account):
☐ Net Banking
☒ Debit Card
☐ Credit Card

Type of Card (Only for Debit or Credit card) Payment:
☒ Master Card
☐ Visa Card

◆ Paid

FIG. 2

| | Item no. | Description | Price | Amount |
|---|---|---|---|---|
| 2 | 1001 | Widget Type A | 12.00 | 24.00 |
| 6 | 1103 | Bracket - Widget Type C | 31.50 | 189.00 |
| 4 | 1010 | Sprocket - Med | 15.25 | 61.00 |
| 5 | 1242 | Filter - Ex-large | 25.50 | 127.50 |
| 1 | 1502 | Wall plate cover | 15.00 | 15.00 |

| Member Name: | SMITH, ANTHONY | |
|---|---|---|
| Member CIN: | 77629966 | Serv |
| Provider Name: | Aetna | |

| Dates of Service (from - Thru) | Ref Proc Code | Days Units | Billed Amount |
|---|---|---|---|
| 3/5/2019 - 3/10/2019 | 99215 | 1 | 330.34 |
| | | Claim Total | 330.34 |

↑ 326

331 →

| Member Name: | SMITH, MICHAEL | |
|---|---|---|
| Member CIN: | 799878AX | Serv |
| Provider Name: | Aetna | |

| Dates of Service (from - Thru) | Ref Proc Code | Days Units | Billed Amount |
|---|---|---|---|
| 3/5/2019 - 3/21/2019 | 8763 | 1 | 455.50 |
| | | Claim Total | 455.50 |

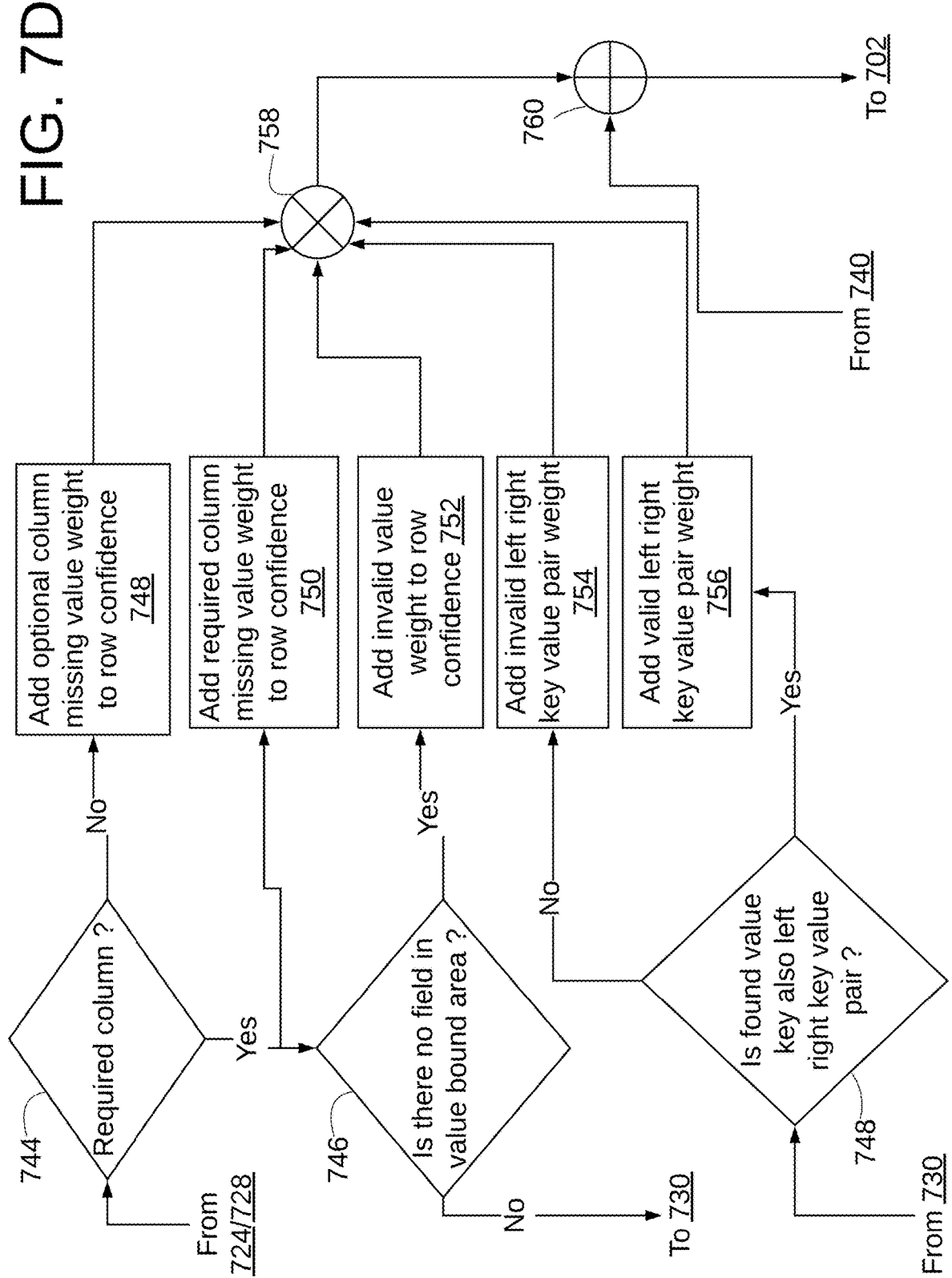

COMPUTERIZED RECOGNITION AND EXTRACTION OF TABLES IN DIGITIZED DOCUMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates generally to the field of data processing systems and more particularly to document recognition.

BACKGROUND

Accurate identification and extraction of data from business documents is an important aspect of computerized processing of business documents. Business documents can be structured in a variety of ways with many documents being "semi-structured" meaning that certain portions of a document may be highly structured, with other portions being unstructured which can include an image and/or text. Many documents are received in an image encoded form (such as PDF, TIFF) and many documents that are received in paper form are converted to an image encoded form for storage and processing. The electronic information regarding formatting of such documents is therefore not available and the information must either be manually reviewed and manually inputted into a computer application or the formatting of the document must be automatically or semi-automatically recognized in order to permit automated identification and understanding of the contents of the document.

Tables are a commonly used information organization technique, where information is organized in a row/column type format. Tables may take a number of different formats with the rows and/or columns being delineated by solid or dotted lines or no lines at all. Rows and columns can be of different widths and heights, can span multiple pages. Given the aforementioned variety, accurate recognition of the existence of a table and its contents and accurately attributing any given cell to the appropriate row/column identifier can be challenging. This is particularly challenging given the variations among documents. Moreover, variations in printing (e.g. different print resolutions, ink types and paper types) and scanning of printed documents (different scanning resolution, inaccurate paper feeding, artifacts introduced by the scanner) make accurate automated recognition of tables and the contents within challenging even in multiple instances of the same type of document.

SUMMARY

Computerized methods and systems for extracting information from a table in a digitized image of a document are disclosed herein. In one aspect, an input image comprising a portion of a digitized image of a document is received, wherein the digitized image includes one or more tables, each of the tables comprising a plurality of cells organized in one or more rows and one or more columns, each of the tables further comprising a header row. Table layout data is retrieved and contains information regarding a plurality of bounding boxes, wherein each bounding box delineates a rectangle surrounding data in a cell of a table in a digitized image of a sample document. Each bounding box is auto-generated by the computerized method and/or (re)generated by a user to the digitized image of the sample document, wherein the digitized image of the sample document contains one or more tables organized similarly to tables in the input sample document. The table layout data includes a row template, corresponding to each table, the row template generated from bounding boxes identified for a table, the table layout data further including data class information that identifies a data type for each cell in a table. A first row template is employed to identify a first table, corresponding to the first row template, in the input image by scanning the document from a first end to a second end, opposite the first end. Upon detecting a possible row in the input image, a row possibility confidence value is generated that indicates a likelihood that the possible row corresponds to a row in the first table. After scanning the first table and converting image information in each cell to data in the earlier defined data type, if the row possibility confidence value exceeds the predetermined threshold, information is extracted from each cell in that row of the first table.

Advantageously, certain embodiments, to reduce user manual effort, only require a user to verify/indicate bounding boxes of fields for the first table in the document. Then, for subsequent tables repeated on the rest of the page and/or document, and for other similar documents, the data is extracted automatically.

Additionally, in certain embodiments, users can link related tables in a document (e.g., table of patient claims data and table of patient services data), selecting one or more fields (e.g., patient ID, claim ID) to appear in both tables. Then within the same or other pages in that document, and within similar documents, the system links related tables automatically to each other and provides the results in a structured file (e.g. CSV file) with the linkage. Then, through robotic process automation, tables in the same structured file can be then merged to one master table automatically.

Additionally, in certain embodiments, hard-to-read table headers or non-existent table headers do not block extraction of table values. Only the primary column requires a readable and existent table header to extract table values across columns. In contrast, for other columns, the user does not need to map a table header and only needs to map the first column value. Then for other column values on the same page or document or similar documents, the system can automatically extract the values.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2 shows is a larger scale version of the digitized document 104 of FIG. 1.

FIG. 3B and FIG. 3C show examples of two different types of tables that may be processed by the table extraction system.

FIG. 4 illustrates a row template employed to scan for tables in a digitized document.

FIGS. 7A, 7B, 7C, and 7D are flow charts showing details of operation of a row possibility confidence generator.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
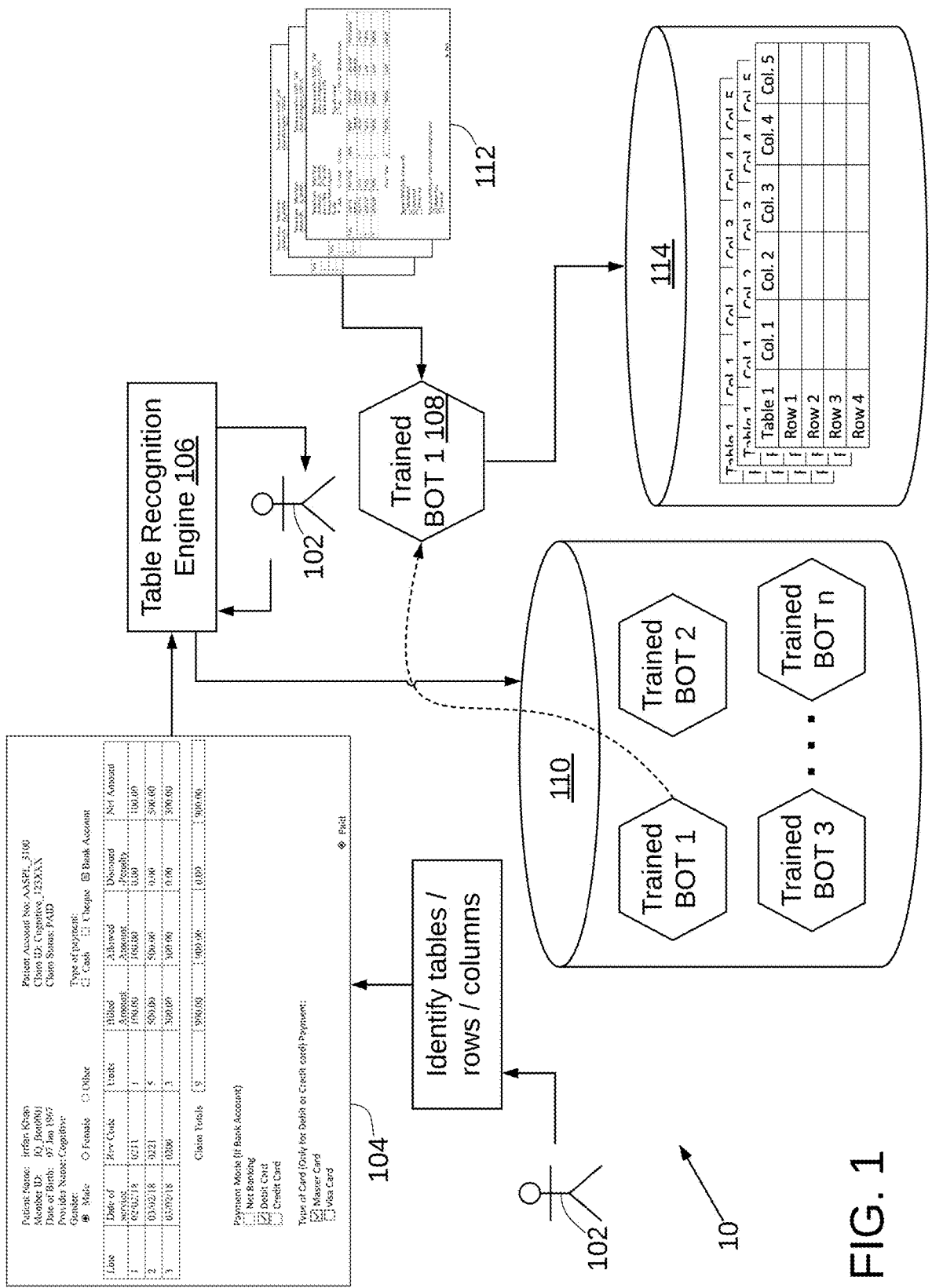
FIG. 1 is a high-level block diagram of an embodiment of a table extraction system.

FIG. 1 provides an overview of a system that automatically recognizes tables within a document and extracts the contents thereof. In the embodiment of FIG. 1, user 102 views a digitized image of a document 104 (such as a PDF or TIFF file) and annotates the document 104 by identifying tables contained in the document that the user 102 wishes to be identified by the system 10. The document 104 is shown in further detail in FIG. 2. The document 104 contains five tables: 202, 204, 205, 206 and 208. Tables 206 and 208 have borders on the external edges as well as for each cell to clearly delineate by way of a line the various rows and columns of the table. Tables 202, 204 and 205 are organized in rows and columns but have no lines to visually delineate the outer boundaries or the internal rows/columns. Tables 202, 204, and 205 may be referred to as tables/sections, or alternatively simply as tables.

The annotated document 104 is processed by table recognition engine 106 to train the engine to recognize desired tables. The trained engine 106 may then be subsequently used in a corresponding, user-trained software robot ("bot") 108 to recognize tables in the document 104. The bot 108 may be retrieved from data storage 110 which stores a variety of trained bots that may be used to process different types of documents and automate other tasks that require cognitive recognition. The trained bot 108 may be deployed by another user to process multiple documents 112 that are similar to document 104, in that they contain the types of tables on which the bot 108 has been trained. In this respect the bot 108 can automate the extraction of information from a large volume of the same or similar documents of which only the image is available, such as forms that may be employed by a business or government, as opposed to an encoded digital form of a document where the fields in the document may be programmatically recognized by an application program. A textually encoded representation of the recognized labels and values of the associated recognized tables is stored in a structured file, such as a CSV file or database, such as 114 where they may be accessed for processing and manipulation by another software program like robotic process automation.

Figure 3A:
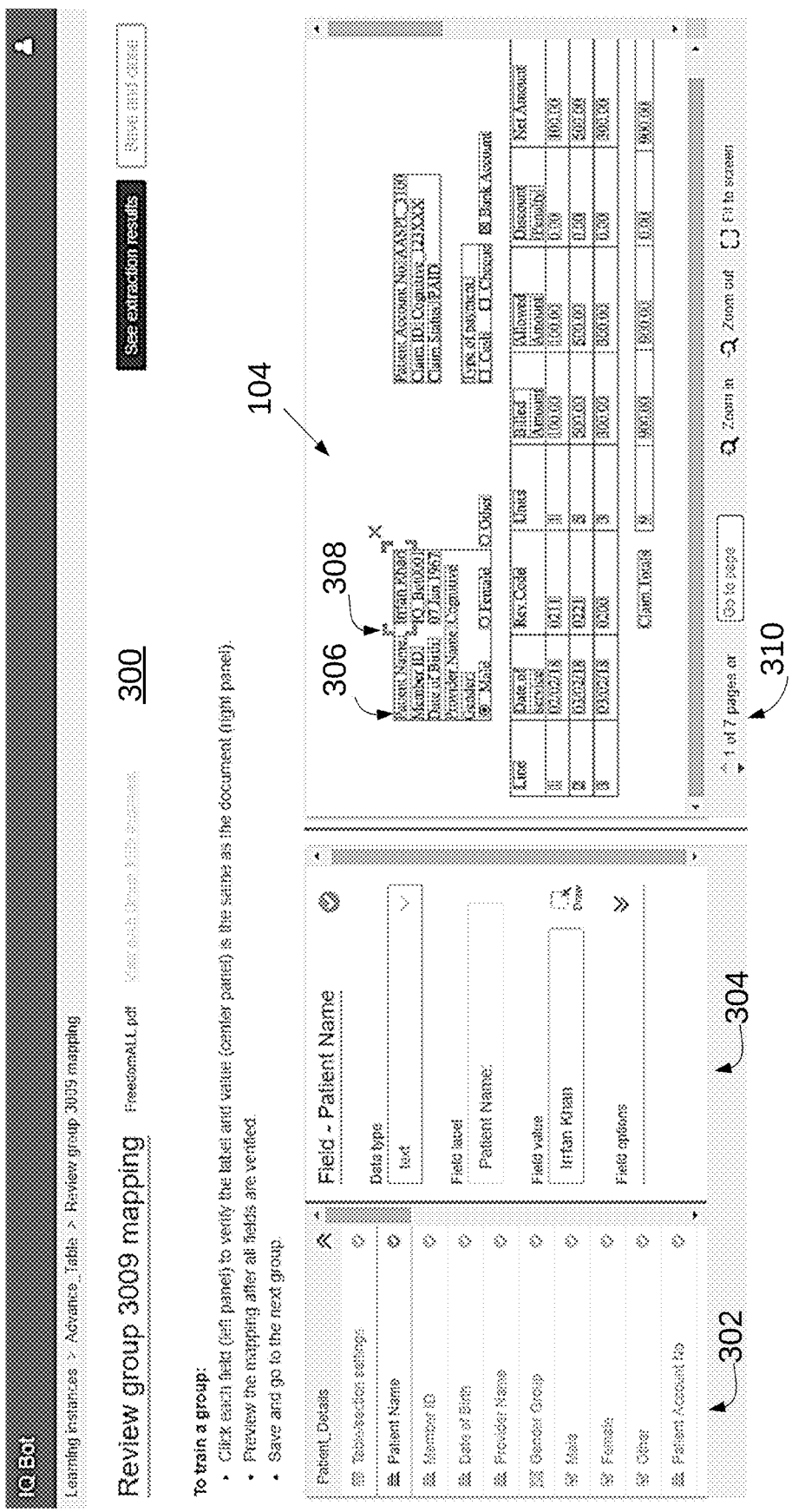
FIG. 3A is a screenshot of a user interface employed with the table extraction system.

FIG. 3A is a screenshot of a user interface employed with the table extraction system. FIG. 3A shows a user interface 300 provided by the system 10 that permits user 102 to identify tables of interest and rows/columns in such tables. The user interface 300 permits the user 102 to visually identify tables in the document 104 by generating a bounding box, such as seen at 306 for a table and for cells within the table by way of a guide box 308. Panels 302 and 304 permit user 102 to designate labels for the identified tables and rows/columns of such tables. The system 10 scans each designated table and row/column, identifies labels and values and provides the identified tables, rows/columns, and labels for viewing and confirmation and/or editing by the user 102. Left panel 302 displays to the user 102 the fields of interest and center pane 304 displays the recognized label and value associated with the specific field of interest selected in panel 302. As seen at 310, the document 104 may include multiple pages, each page of which may contain one or more tables. The system 10 can extract tables repeated across the same page and/or document without requiring a user, during bot training, to generate the bounding boxes of fields for each table to extract these tables. To reduce user manual effort, the system 10 only requires a user to verify/indicate bounding boxes of fields for the first table only. Then, for subsequent tables repeated on the rest of the page and/or document, and for other similar documents, the data is extracted automatically.

FIG. 3B and FIG. 3C show examples of two different types of tables that may be processed by the table extraction system. FIG. 3B shows a conventional table with a header 316 including a label for each of a plurality of columns 318, 319, 320 and 321. As seen not all columns may have a label such as column 317. FIG. 3C shows two tables 326 and 328 contained in the same document, and sometimes on the same page. The tables 326 and 328 have the same structure and are referred to herein as a repeated table. The embodiments disclosed herein require identification by the user by way of a bounding box of only the header such as seen at 330 or 331 of a single table of a set of repeated tables. The table extraction system then automatically identifies from the single bounding box identifying a header of a repeated table the other repeated tables of the same structure that are contained in the same document. This significantly saves manual effort by avoiding the need for a user to identify the header of a table that may be repeated many (dozens or hundreds) times in a single document and in other documents.

Figure 4:
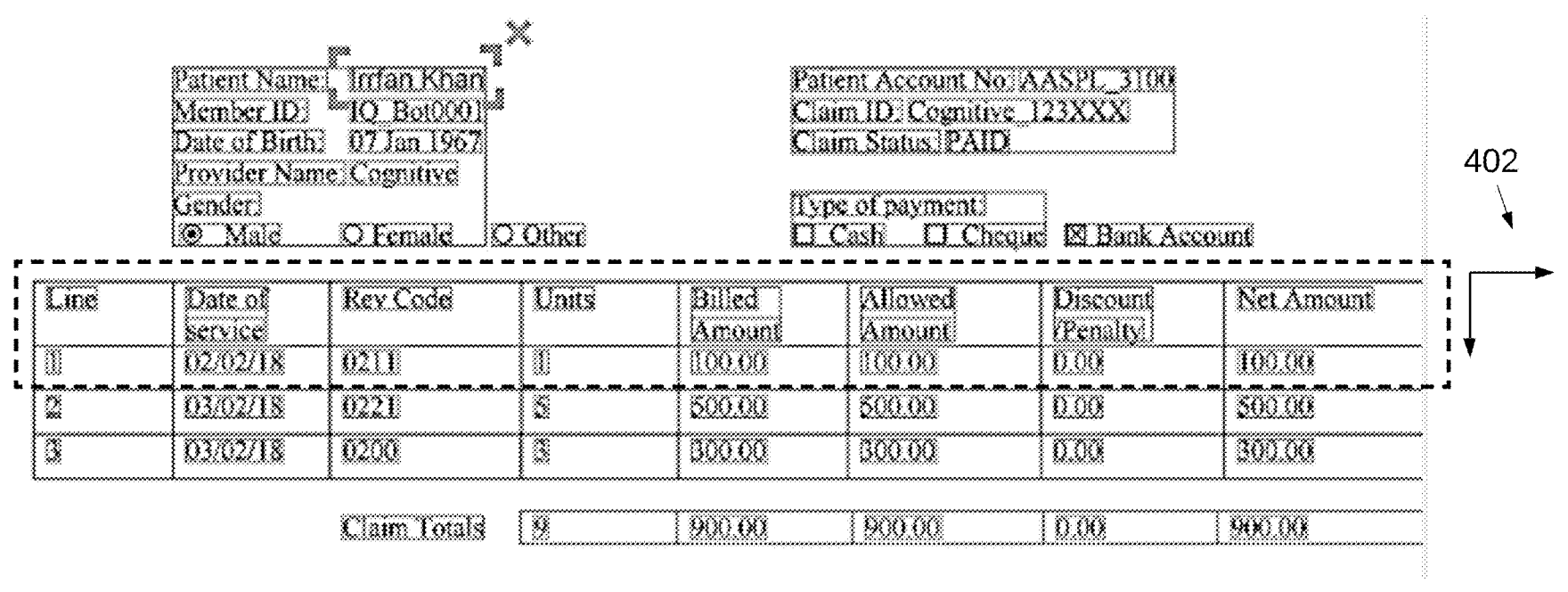

Business forms can have a variety of formats and in any given page there may be multiple tables and tables may have a variety of different formats. For example, a row in a table may have multiple lines of text, which complicates identification of a row in a table. Also, for the labels identified by the user 102 for columns in a table, the text corresponding to a particular label for a column may appear elsewhere on a page. The disclosed embodiments scan the document 104 from top to bottom and left to right employing the bounding boxes entered by the user that together for a table form a row template for the table, searching for the labels entered by the user, as generally shown in FIG. 4 at 402.

Figure 5A:
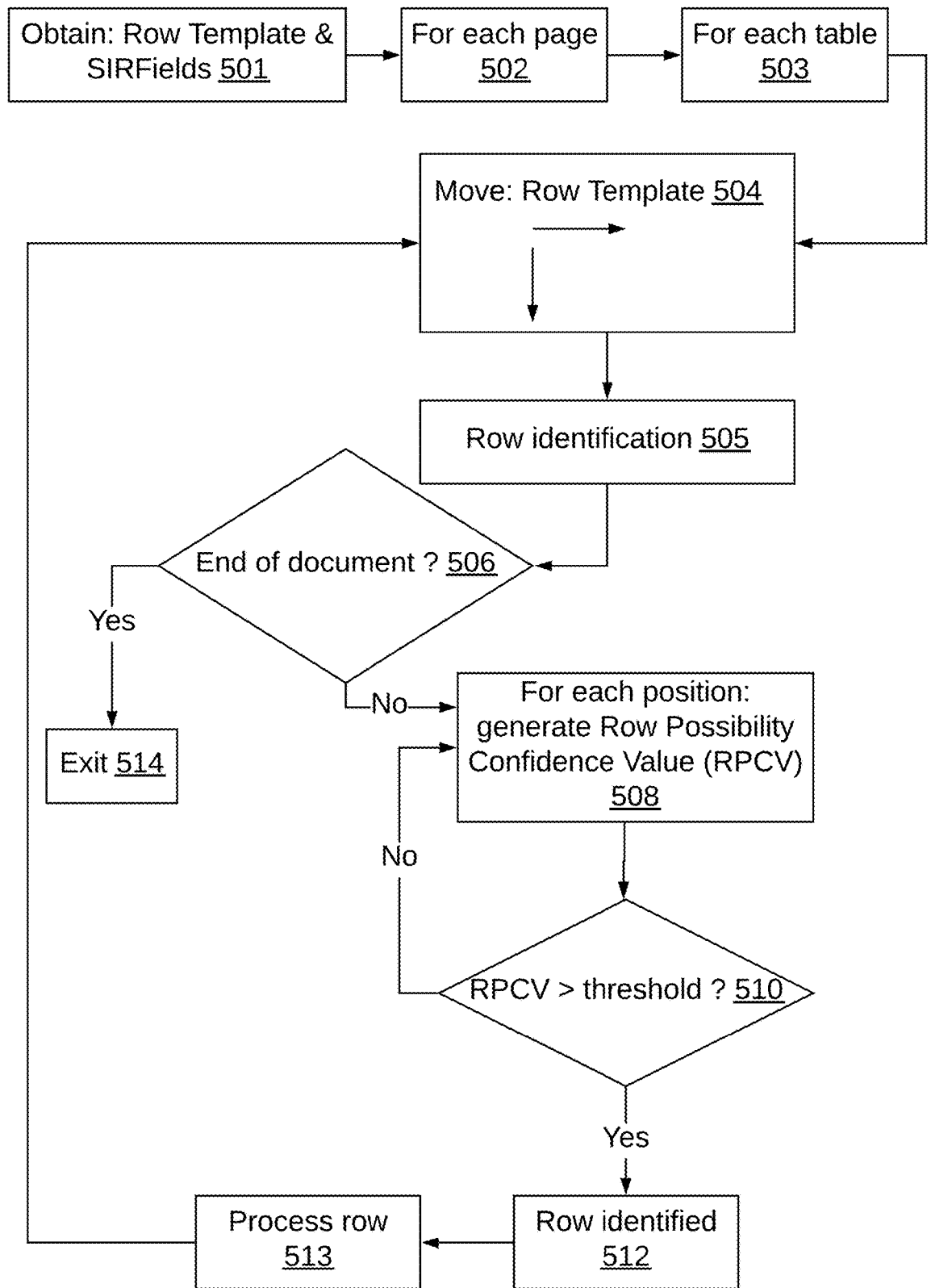
FIG. 5A is a high-level flow diagram showing operation of the table extraction system.

FIG. 5A is a high-level flow diagram showing operation of the table extraction system. The table recognition engine 106 obtains at 501 a row template and SIRFields for a first table in document 104. SIRFields is a data holder class that is generated for each field, region and line in document 104 after performing OCR on the document and is particularly useful in identifying a table when there are multiple tables of the same format on a page. The SIRField contains the position and text within each field, and optionally may contain a confidence value indicative of the accuracy of the OCR. The engine 106 operates on each page (502) and on each table (503) in document 104 to process each table on every page in a document. Details of operation 501 can be seen in FIG. 5B.

Figure 5B:
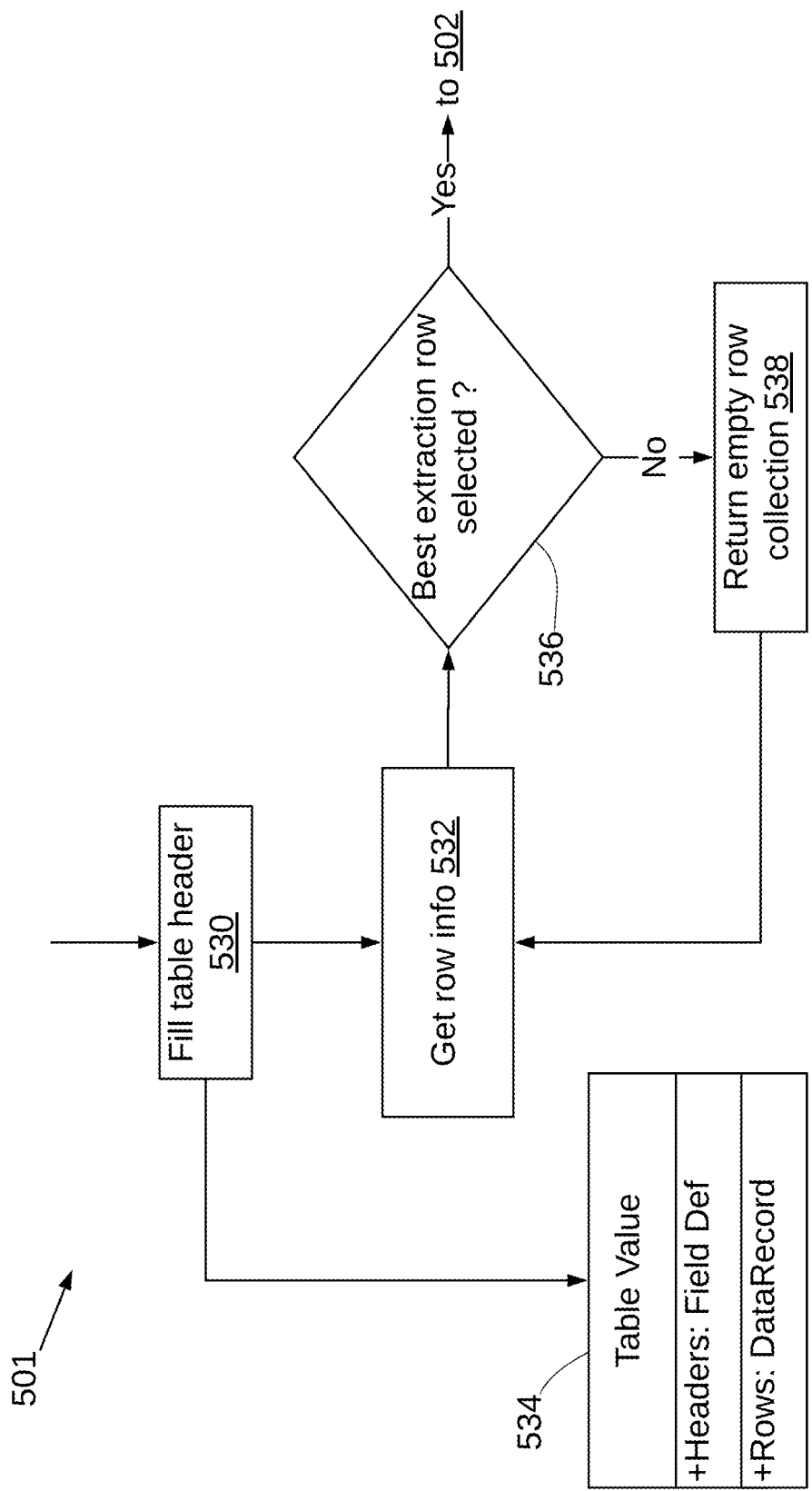
FIG. 5B shows additional details of operation 501 of FIG. 5A.

In FIG. 5B, upon retrieving the row template and SIRFields for a first table in document 104, the engine 106 retrieves by scanning document 104 the header information for the first table. Such information includes labels identifying the type of information contained in each column of a table. This header information from scanning is converted from scanned image format to a textual format and stored in a table data structure 534, which contains the label for each column along with the data type as entered by user 102. The engine 106 then proceeds to scan document 104 with a row template to identify a first row in the first table. The row template is generated from the bounding boxes and the bounding boxes are auto-generated and/or (re)generated by the user 102, that designate a header for a table and all columns of the table. It is used to detect rows while scanning document 104. The system generates for each row template one or more column templates for each row template, where each column template is generated in accordance with a bounding box inputted by the system 10 and/or a user. For the first row recognized, the engine 106 determines at 536 if the row is a best extraction row, which is a row with high-confidence values that exist across all desired table columns In certain documents, a label in a column in a table may occur elsewhere in a document. In such a case the existence of the text corresponding to a column label can introduce ambiguity into the determination of whether a particular text string encountered by the engine 106 denotes the presence of a row in a table or simply the existence of other text in the document 104. The engine 106 advantageously searches for another row in the first table as a best extraction row to increase the chances of proper identification of a table for extraction. If at 536 the row recognized is not a best extraction row, then an empty row collection response is provided causing the engine 106 to continue scanning the first table for another row that matches the criteria for a best extraction row. Once a best extraction row has been identified at 536 the engine 106 proceeds to operation 502 seen in FIG. 5A.

The engine 106 at 502, 503 proceeds to scan the document 104, pixel line by pixel line from left to right, top to bottom in the loop comprising operations 504, 505, 506, 508, 510 and 512, until the end of the document is reached, operation 506. As seen at 508, for each position a Row Possibility Confidence Value (RPCV) is generated. The RPCV is compared at 510 to a predetermined threshold value and if the RPCV value is greater, then the current position is identified as a row. The loop continues until the end of the document is encountered at 506 and the routine terminates at 514.

Figure 6A:
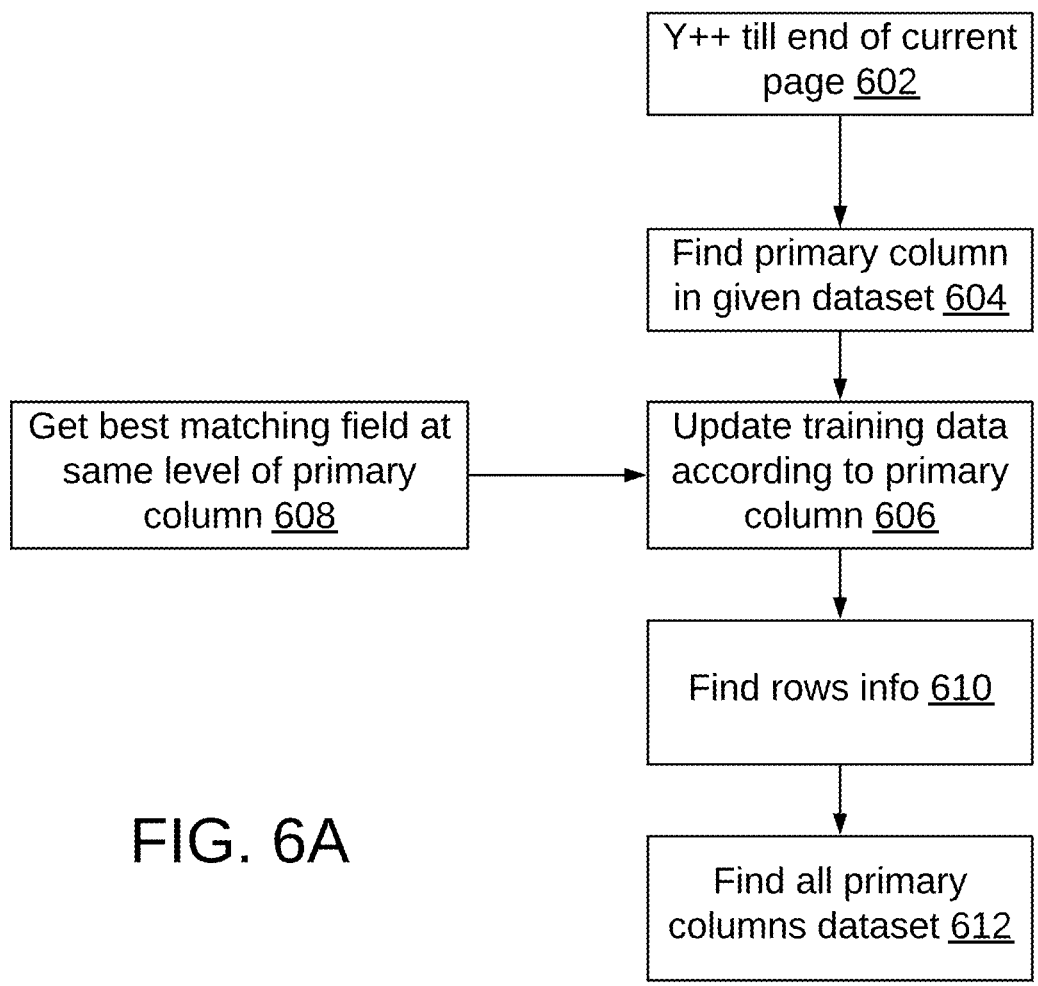
FIGS. 6A and 6B are flow charts showing operations performed to populate identified tables in a digitized document.

FIG. 6A illustrates details of operation 502 in which a page in a document 104 is scanned to identify each table on the page. A line counter (Y++) is set and subsequently incremented at 602 to scan each pixel line in a page. Upon encountering a table by employing the row template, the table is scanned at 604 to identify a primary column in the dataset of pixels, which are identified as comprising the table. In some tables, some columns may have multiple lines in a cell. In such a case, ambiguity can arise in identifying the contents of the particular cell. In such as case, a column in the table which has a single line of text is identified as a primary column. At 606, the training data comprising the bounding boxes entered by the system and/or user 102 is updated, as necessary, by comparing (i) the data in the primary column with the bounding boxes entered by the system 10 and/or user 102 to (ii) the data identified in the primary column. This is performed at 608, by identifying the best matching field at the same level, in other words within the same header(key)'s titles row of the primary column header(key). Rows information ("row info")—which comprises the set of information identifying all rows for each column—is identified at 610. At 612 the data for all primary columns on the page is retrieved to generate a primary columns dataset.

Figure 6B:
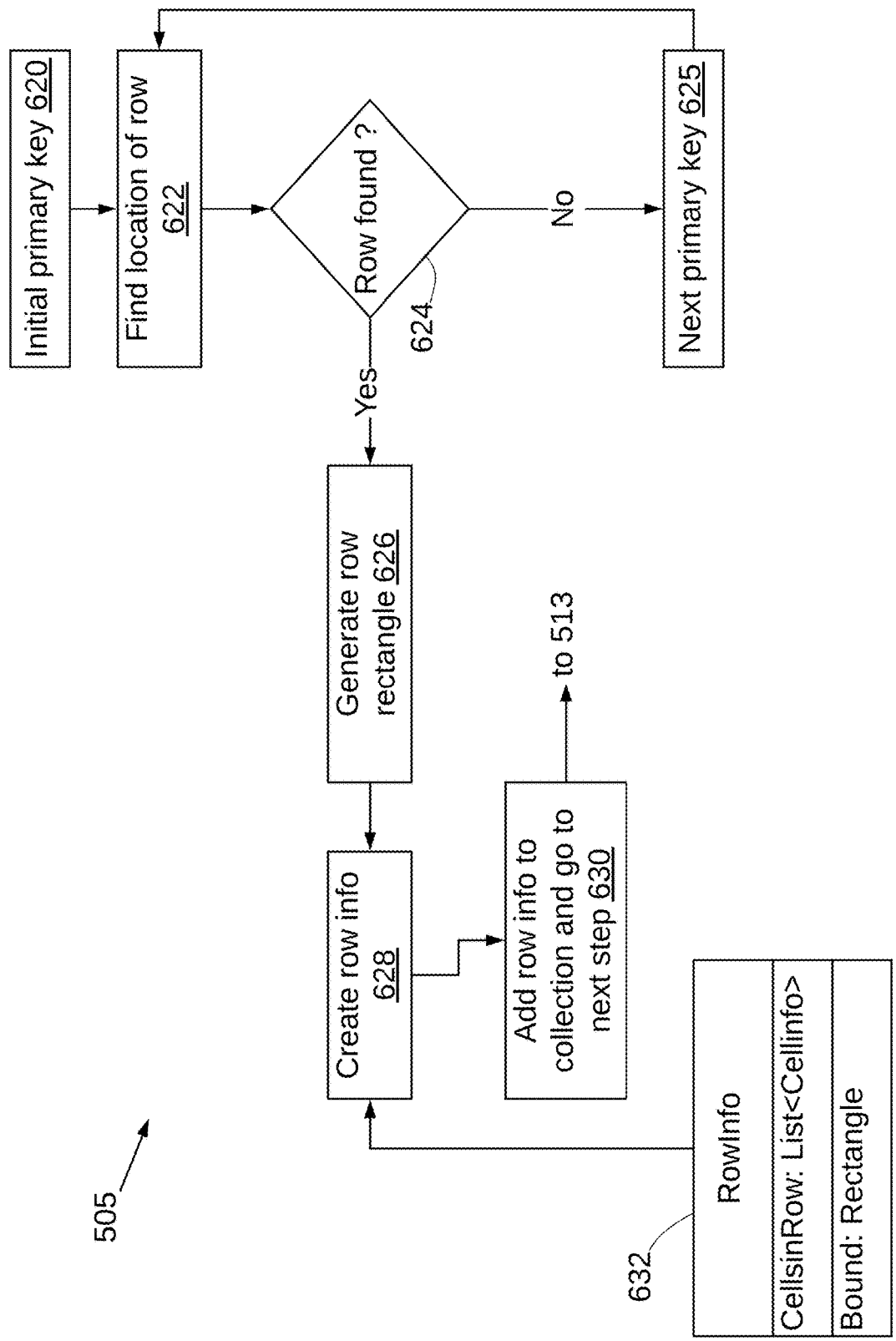

FIG. 6B illustrates details of operation 505 of FIG. 5 where rows in a table are identified. An initial primary key identified for the table is retrieved at 620 and is used at 622 to scan the table until a row is found (624). In the event that a row cannot be identified using the initial primary key field value, the next primary key field value in the current table is auto-selected at 625 and the table is scanned again at 622. Once a row has been found, a rectangle identifying boundaries of the identified row is generated at 626. At 628 row info for the identified row is created and at 630 the row info is stored to a data structure created to contain data extracted from the identified table. The row info as seen at 632 includes textually encoded information contained in each cell in the row along with coordinates defining the row rectangle generated at 626. The next primary key for the current table is selected at 625 and operations 622, 624, 626, 628, 630 and 632 are repeated until all rows in the table have been processed. Certain rows in a table may have multiple lines. Employing the bounding boxes generated by the system 10 and/or user 102, the routine preferably selects a column comprising only a single row of information to reduce ambiguity. If a best extraction row has been selected, for each page in the document 104 (608), the routine processes a single page from top to bottom (610), as shown in FIG. 6B.

FIGS. 7A, 7B, 7C, and 7D are flow charts showing details of operation of the row possibility confidence generator referenced at 408 in FIG. 4. The row possibility confidence generator operates to generate a confidence value indicative of possibility of a row existing for the row template at a given location in the document. The row possibility confidence generator uses a number of feature sets and associated weights set forth in Table 1 below for each column.

TABLE I

| Feature Set | Positive Weight | Negative Weight |
|---|---|---|
| 1. Found column's value | 0.75 | |
| 2. Invalid data type value | | −1 |
| 3. Invalid left right key value pair (left header and right value) | | −0.75 |
| 4. Matching data type of found column's value | 0.75 | |
| 5. Missing optional column's value | 0.50 | |
| 6. Missing required column's value | | −0.50 |
| 7. Partially matching data type of found column's value | 0.50 | |
| 8. Valid left right key value pair (left header and right value) | 0.75 | |

Figure 7A:
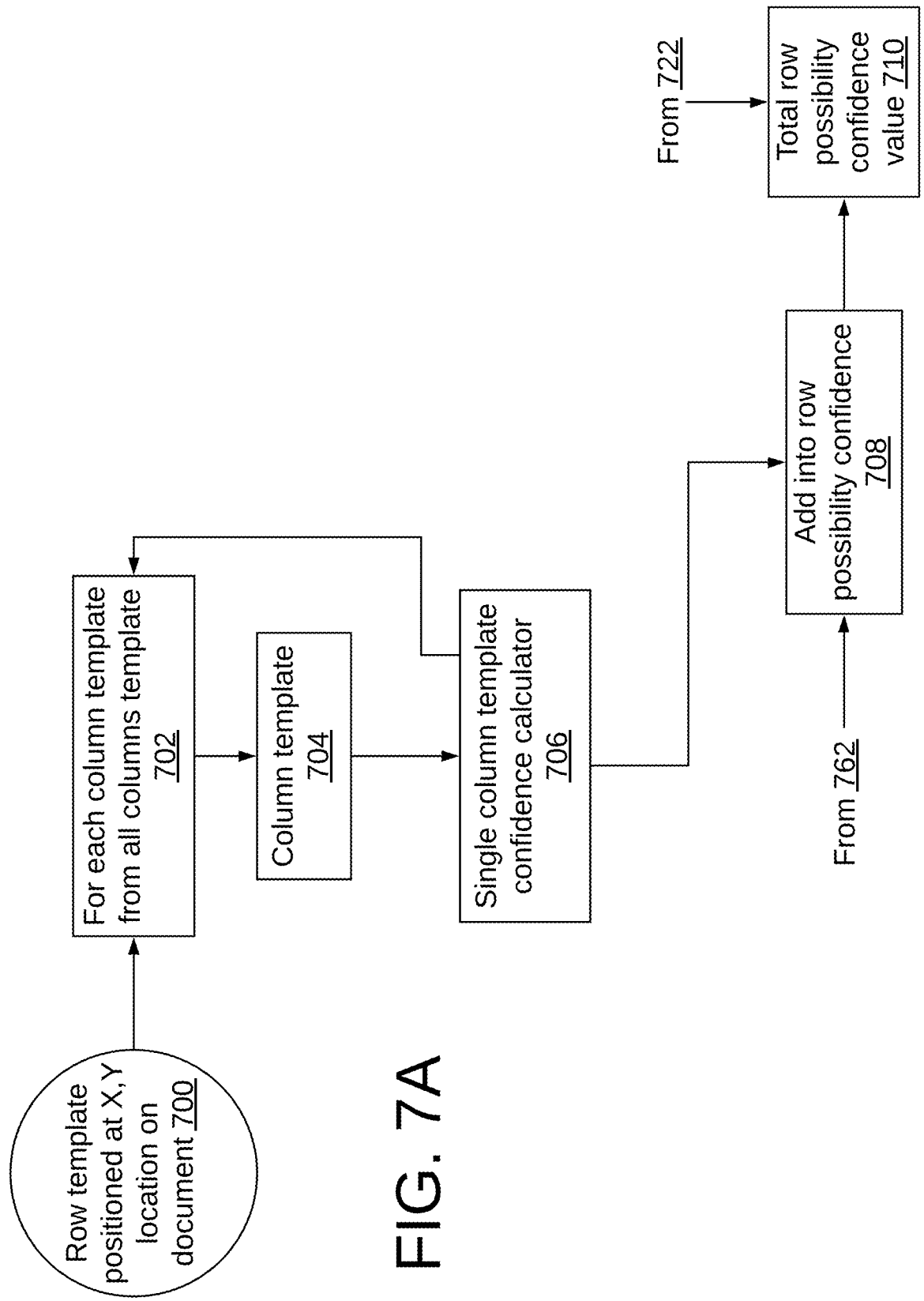

Turning to FIG. 7A, at 700, for a row template positioned at a coordinate X,Y in a document, the operations in FIGS. 7A, 7B, 7C and 7D are performed to generate a row possibility confidence value. As seen in FIG. 7A, each column template in the row template (702) is selected for processing and a confidence value is generated at 706 for the selected column template. This is added to a row possibility confidence value at 708 to generate a row possibility confidence value at 710.

Figure 7B:
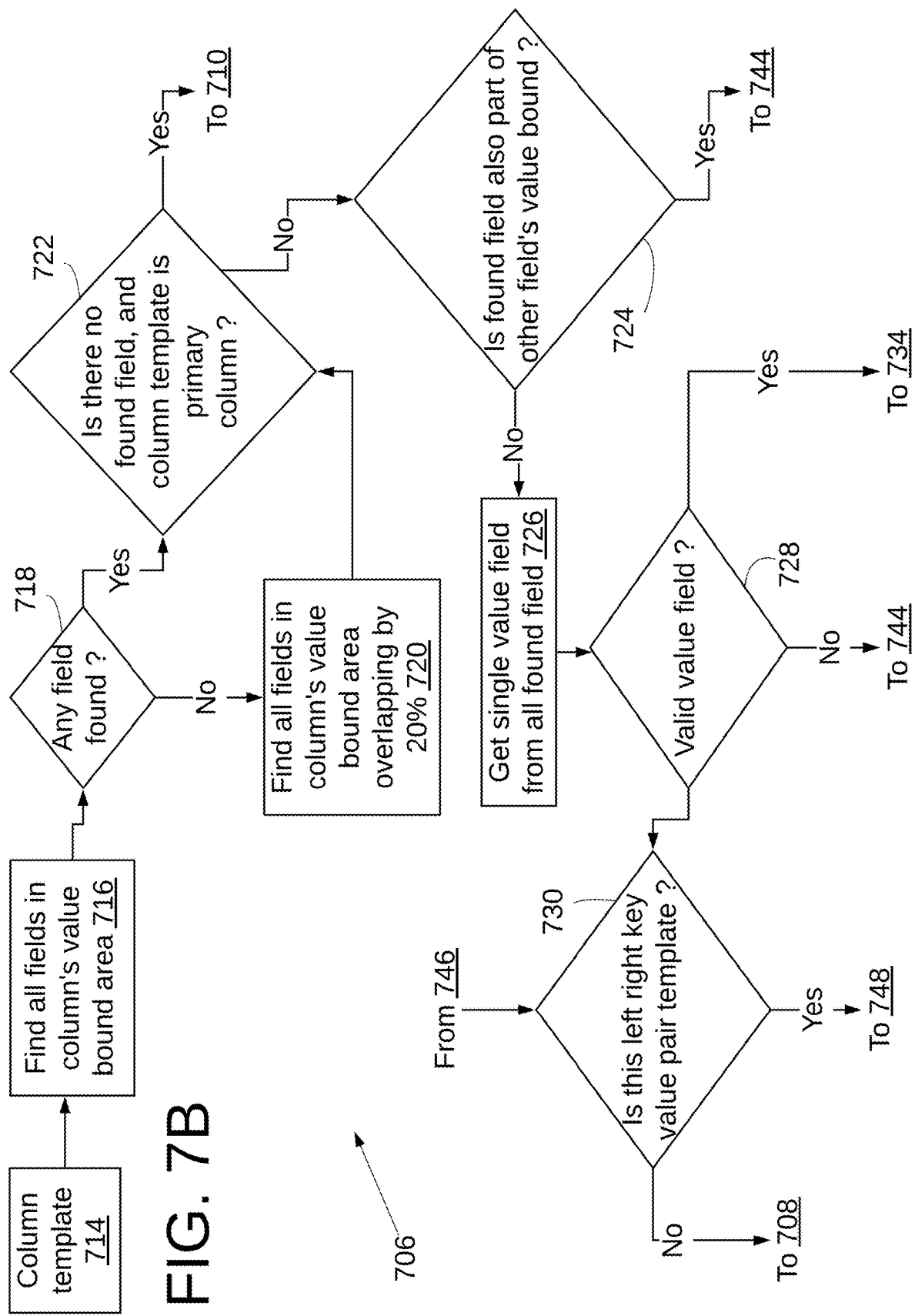
Figure 7C:
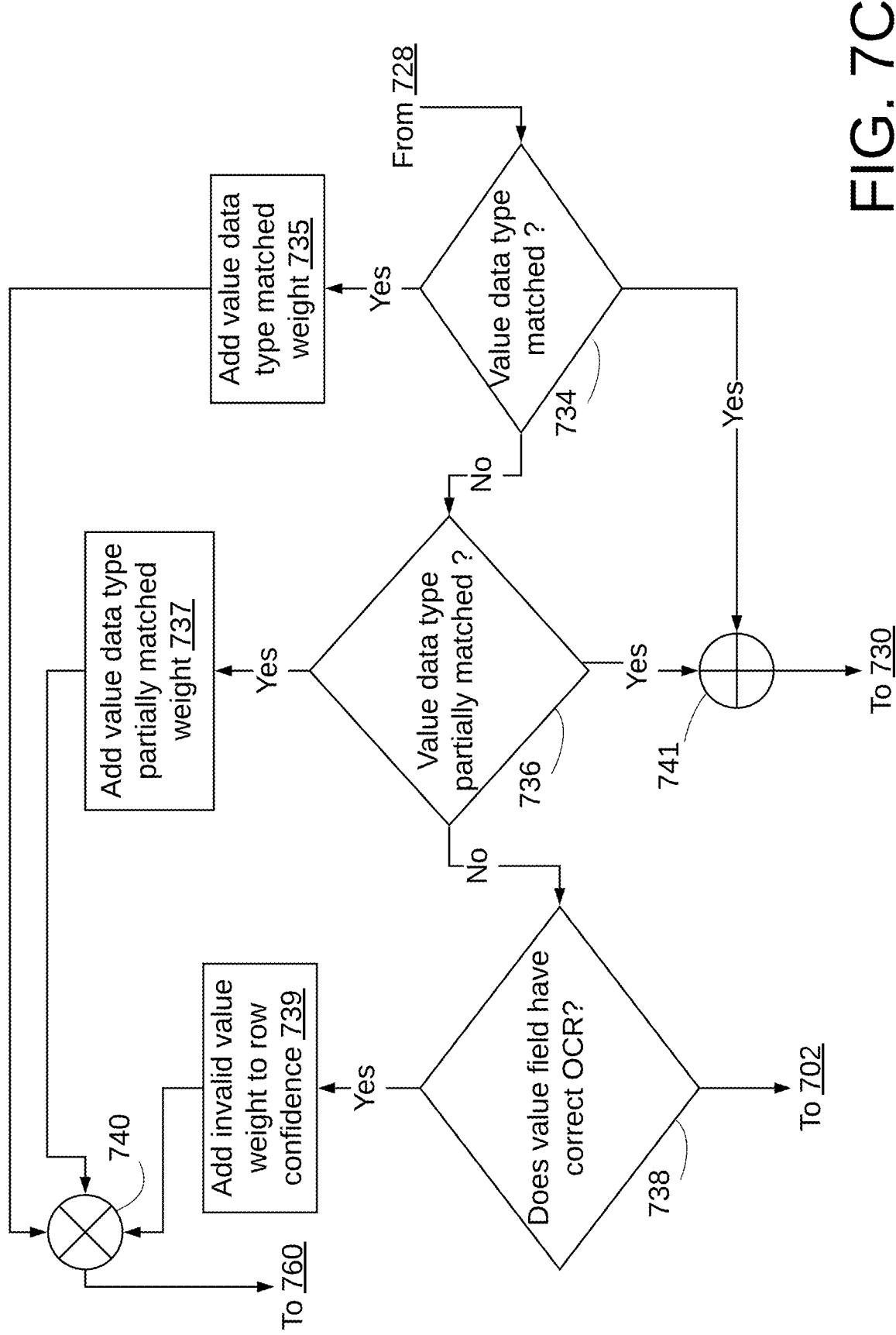

Generation of the single column confidence value at 706 is shown in further detail in FIGS. 7B, 7C and 7D. A column template is retrieved at 714 and all fields in the column templates value bound area (within the boundaries of the column template) are identified at 716. If it is determined at 718 that no fields are identified in the column templates value bound area then fields that may overlap into the or out of the column templates value bound area are identified, specifically those that overlap by 20% (of horizontal space occupied) or more. At 722, a test is performed to determine if no fields were identified meeting the criteria of 718 or 720 and if the column template is the primary column. If at 722 it is determined that there is no found field and the column template is the primary column then routine proceeds to 710 to determine the total row possibility confidence value, which in this case will be calculated to be zero. If at 722 it is determined that a field has been identified at 718 or 720, and if the column template does not correspond to the primary column then at 724 a test is performed to determine if the found field is also part of another fields value bound. If not then at 726 the single value field from all of the found fields is extracted and at 728 a test is performed to determine if the extracted field is a valid value field by comparing the data type of the extracted field to the expected data type, as initially generated by system 10 and/or the user, as explained above in connection with FIG. 3. If at 724 the found field is determined to be part of another field's value bound then the routine proceeds to 744 and then will move to the next column template. If a valid value field has been identified at 728 then the operations shown in FIG. 7C are performed starting with operation 734, otherwise the operations shown in FIG. 7D are performed starting with operation 744. In either event, the test at 730 is also performed to determine of the column template in question is a left-right key value pair template. A left-right key value pair template is where the key and value are in a single line horizontally such as seen at 202 in FIG. 2. If so, the operation 748 in FIG. 7D is performed. If not the routine proceeds to operation 708.

Turning to FIG. 7C, at 734 if the data type of the value extracted from the column template matches that initially designated by the system 10 and/or user for that particular cell then the value data type matched weight, as shown in Table 1, row 4, is added to a running total of the row possibility confidence value. If the test at 734 fails, then at 736 a test is performed to determine if there is a partial match of the data type. An example of a partial match is an error in recognition of a decimal, error in recognizing a single number, such as "1" is recognized as "I" or "0" as "O". If so then at 737 a partial match weight as shown in Table 1, row 7 is added to a running total of the row possibility confidence value. If the test at 736 fails, then a test is performed at 738 to determine if the value was correctly recognized by OCR, as indicated by an OCR text confidence value generated by the OCR process. If so then at 739 the invalid value weight as shown in Table 1, row 2 is added to the running total of the row possibility confidence value. Otherwise, the routine proceeds to 702 to process the next column template in the row in question. After the tests at 734 and 736, the operation at 730 in FIG. 7B is performed to determine if the column template in question is a left-right key value pair template. If so, then operation 748 in FIG. 7D is performed. If not the routine proceeds to operation 708.

Remaining on FIG. 7D, operation 748 tests to determine if the value found in the column template in question is in a left-right key value pair format. If so then at 756 a valid left-right key value pair weight as shown in Table 1, row 8 is added to the running total of the row possibility confidence value. If the test at 748 fails, then at 754 an invalid left-right key value pair weight as shown in Table 1, row 3 is added to the running total of the row possibility confidence value. After operations 754 and 756 the confidence value of the particular column in question is complete, and control returns to 702 to process the next column template in the row in question.

If at operation 728 in FIG. 7B a valid value field is not found, then at 744 in FIG. 7D, a test is performed to determine if the column in question is a required column. If not then at 748 the optional column missing value weight as shown in Table 1, row 5 is added to the running total of the row possibility confidence value and control passes to 702. If the column in question is determined at 744 to be a required column then at 750 the required column missing value weight as shown in Table 1, row 6 is added to the running total of the row possibility confidence value and at 746 a test is performed to determine if there is no field in the value bound area. If this is true, then at 752 the invalid value weight as shown in Table 1, row 2 is added to the running total of the row possibility confidence value. Otherwise, the routine proceeds to operation 730.

Figure 8A:
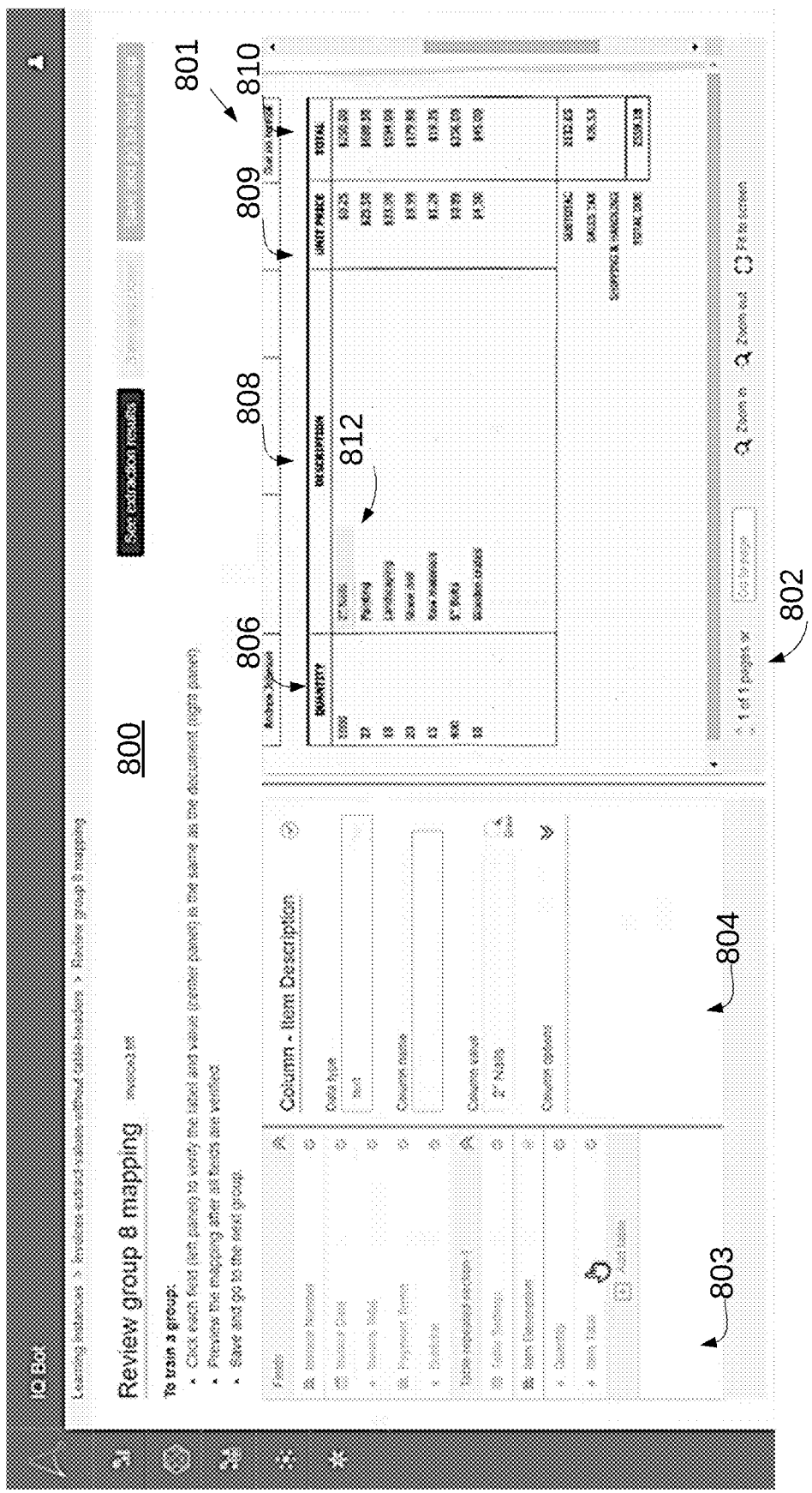
FIG. 8A shows an example of a user interface and inputs by a user to designate a table for processing by the system.
Figure 8B:
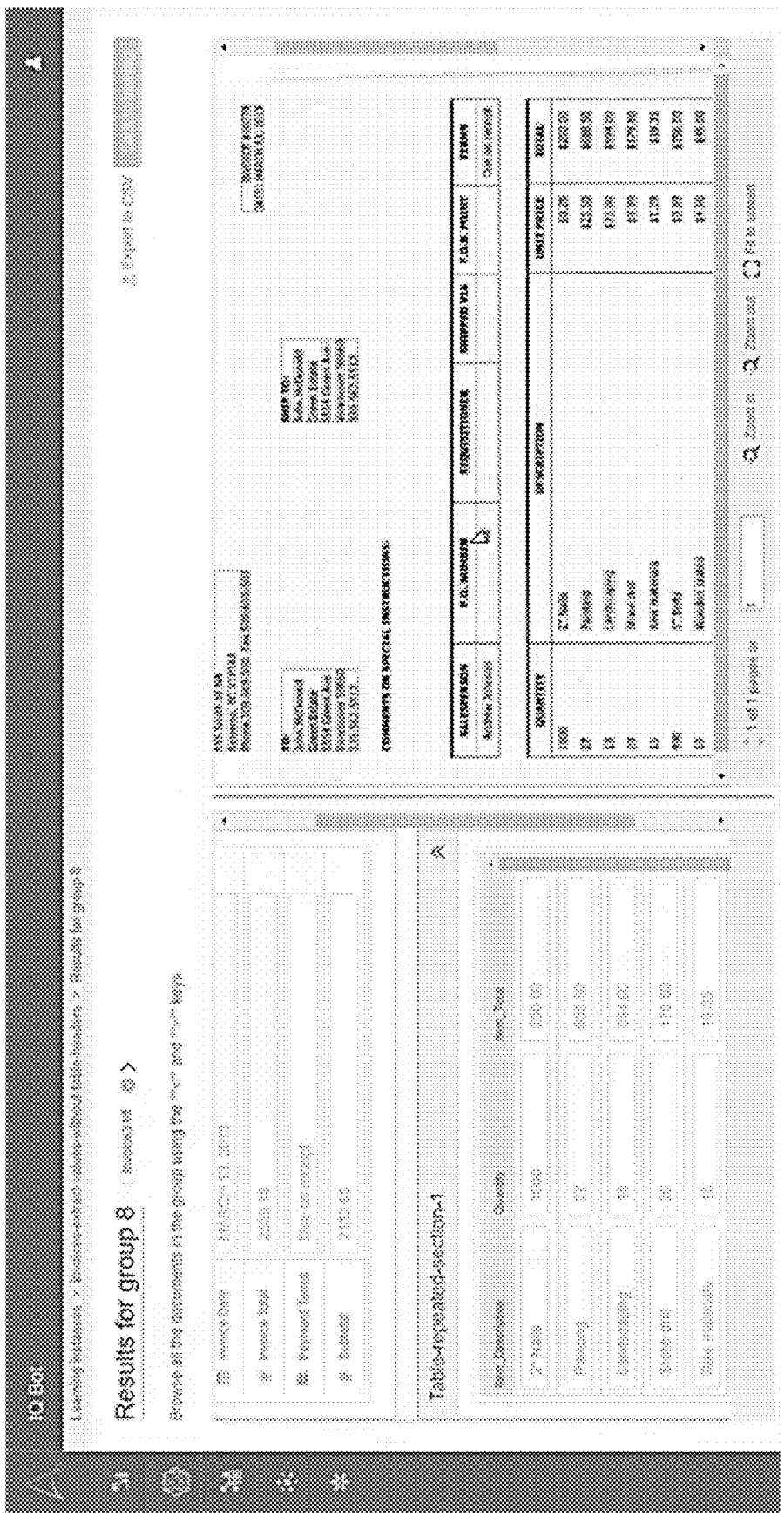
FIG. 8B shows results of processing the table shown in FIG. 8A.

FIG. 8A shows an example of a user interface and inputs by a user to designate a table for processing by the system. In FIG. 8A user interface 800 provided by the system 10 permits user 102 to identify for a selected table of interest shown at 801 the rows/columns in the table 801 which is contained in a document 802. Panels 803 and 804 permit user 102 to designate labels for the identified tables and rows/columns of such tables. In panel 803 the user 102 may identify fields in the table 801 and in panel 804 the user 102 may specify field labels and/or field values and data types for a particular column in the table 801. In the embodiment shown in FIG. 8A, the system 10 permits simplified identification of data in the table 801 by permitting user identification by way of a bounding box 812 only the first (top) item of data in a column such as column 806, 808, 809, 810. As seen, the user 102 has selected the top-most item of data in column 808 by way of bounding box 812. The system advantageously is able to automatically identify the remaining rows of data in column 808, Similar operations and resulting system actions may be performed on other columns such as 806, 809, 810. The system 10 further reduces user input necessary by requiring identification by the user of only the column label for the primary column. For example, if column 806 is the primary column, only the label for column 806 ("QUANTITY") needs to be provided by the user 102, such as by manual entry into panel 804 or by visual selection and system recognition of the selected text. This reduces input required by the user 102. It also allows extraction of table column values even if headers for table columns are non-existent or may be unreadable due to errors in scanning or illegible text in the original document. FIG. 8B shows results of processing the table shown in FIG. 8A The data from table 801 has been extracted by the system 10 and some of the extracted data is shown at panel 820.

Another feature of the system 10 is the ability to link related tables. The system 10 advantageously permits user 102 to link related tables in a document (e.g., table of patient claims data and table of patient services data), by selecting one or more fields (e.g., patient ID, claim ID) to appear in both tables. Then within the same or other pages in that document, and within similar documents, the system 10 links related tables automatically to each other. The results are automatically output to a structured file, such as a CSV with the linkage. Then, through robotic process automation, tables in the same CSV file can be then merged to one master table automatically.

Figure 9:
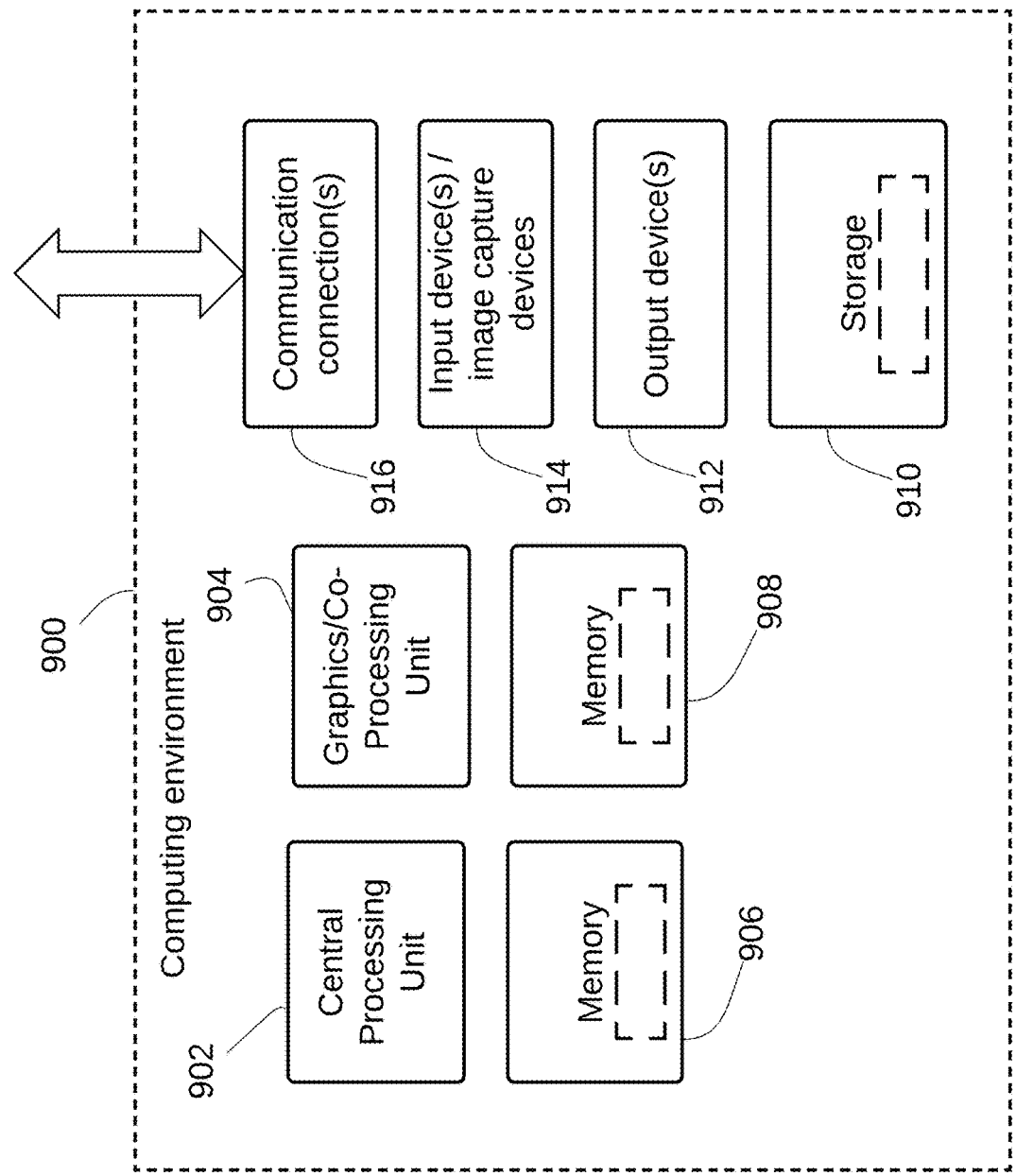
FIG. 9 illustrates a block diagram of hardware that may be employed in an implementation of the systems disclosed herein.

FIG. 9 illustrates a block diagram of hardware that may be employed in an implementation of the Cognitive plus RPA system as disclosed herein. FIG. 9 depicts a generalized example of a suitable general-purpose computing system 900 in which the described innovations may be implemented in order to improve the processing speed and efficiency with which the computing system 900 operates to perform the functions disclosed herein. With reference to FIG. 9 the computing system 900 includes one or more processing units 902, 904 and memory 906, 908. The processing units 902, 906 execute computer-executable instructions. A processing unit can be a general-purpose central processing unit (CPU), processor in an application-specific integrated circuit (ASIC) or any other type of processor. The tangible memory 906, 908 may be volatile memory (e.g., registers, cache, RAM), non-volatile memory (e.g., ROM, EEPROM, flash memory, etc.), or some combination of the two, accessible by the processing unit(s). The hardware components in FIG. 9 may be standard hardware components, or alternatively, some embodiments may employ specialized hardware components to further increase the operating efficiency and speed with which the system 100 operates. The various components of computing system 900 may be rearranged in various embodiments, and some embodiments may not require nor include all of the above components, while other embodiments may include additional components, such as specialized processors and additional memory.

Computing system 900 may have additional features such as for example, storage 910, one or more input devices 914, one or more output devices 912, and one or more communication connections 916. An interconnection mechanism (not shown) such as a bus, controller, or network interconnects the components of the computing system 900. Typically, operating system software (not shown) provides an operating system for other software executing in the computing system 900, and coordinates activities of the components of the computing system 900.

The tangible storage 910 may be removable or non-removable, and includes magnetic disks, magnetic tapes or cassettes, CD-ROMs, DVDs, or any other medium which can be used to store information in a non-transitory way, and which can be accessed within the computing system 900. The storage 910 stores instructions for the software implementing one or more innovations described herein.

The input device(s) 914 may be a touch input device such as a keyboard, mouse, pen, or trackball, a voice input device, a scanning device, or another device that provides input to the computing system 900. For video encoding, the input device(s) 914 may be a camera, video card, TV tuner card, or similar device that accepts video input in analog or digital form, or a CD-ROM or CD-RW that reads video samples into the computing system 900. The output device(s) 912 may be a display, printer, speaker, CD-writer, or another device that provides output from the computing system 900.

The communication connection(s) 916 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method for extracting information from a table in a digitized image of a document comprising:
   receiving an input image comprising a portion of a digitized image of a document, wherein the digitized image includes one or more tables, each of the tables comprising a plurality of cells organized in one or more rows and one or more columns, each of the tables further comprising a header row;
   retrieving table layout data containing information regarding a plurality of bounding boxes, wherein each bounding box delineates a rectangle surrounding data in a cell of a table in a digitized image of a sample document representative of a group of similar documents, each bounding box being generated by the system or regenerated a user to the digitized image of the sample document, wherein the digitized image of the sample document contains one or more tables organized similarly to tables in the input image, the table layout data including a row template, corresponding to each table, the row template generated from bounding boxes identified for a table, the table layout data further including data class information that identifies a data type for each cell in a table;
   for documents in the group of similar documents,
      employing a first row template to identify a first table, corresponding to the first row template, in the input image by scanning the document from a first end to a second end, opposite the first end;

upon detecting a possible row in the input image, generating a row possibility confidence value that indicates a likelihood that the possible row corresponds to a row in the first table;

identifying the possible row as a row in the first table if the row possibility confidence value exceeds a predetermined threshold value; and if the row possibility confidence value exceeds the predetermined threshold, extracting information from each cell of the first table by scanning content in the first table and converting image information in each cell in the first table to data having a data type as specified by the data class information.

2. The computerized method of claim 1 wherein the digitized image of the document comprises multiple pages, with more than one of the pages comprising one or more tables and wherein one or more row templates are employed to identify one or more tables, each table corresponding to a particular row template.

3. The computerized method of claim 1 wherein employing a first row template to identify a first table, corresponding to the first row template, in the input image by scanning the document from a first end to a second end, opposite the first end, comprises:

identifying a primary column, wherein the primary column comprises a column in the first table that contains a single line of data for each of row.

4. The computerized method of claim 3 further comprising, after identifying the primary column:

converting image data in a cell in the primary column to textually encoded data;

comparing the textually encoded data to the data class information corresponding to the cell in the primary column; and updating the data class information if the data type for the cell in the primary column does not match the data type contained in the data class information for the cell in the primary column.

5. The computerized method of claim 4 further comprising, generating a primary column's dataset by:

identifying a best matching field that corresponds to a header title row of the primary column;

identifying rows info comprising a set of information identifying all rows for each column; and retrieving data corresponding to each primary column on a page to generate the data corresponding to each primary column on the page.

6. The computerized method of claim 5 further comprising, identifying rows in each table by:

retrieving an initial primary key corresponding to the first table;

scanning with the initial primary key identified for the first table until a row in the first table is identified;

if a row in the first table cannot be identified using the initial primary key, selecting another primary key corresponding to the first table and scanning the first table with the next primary key until a row in the first table is identified;

upon identifying a row in the first table, generating a rectangle that identifies of the identified row; and creating row information for the identified row and storing the row information to data structure created to contain data extracted from the identified table, wherein the row information includes textually encoded information contained in cells in the row along with coordinates defining the rectangle.

7. The computerized method of claim 6 further comprising:

selecting a best extraction row, comprising a label comprising text that is not found elsewhere on a page on which the best extraction row is located; and for each page in the document processing each page from top to bottom.

8. The computerized method of claim 1 wherein generating the row possibility confidence value, comprises:

employing a plurality of feature sets, each feature set having a weight associated therewith, the feature sets selecting from the set of feature sets comprising, a found column's value indicative of identifying a primary column in the possible row, an invalid data type value indicative of identifying in the possible row an invalid data type, an invalid left right key value pair value indicative of identifying in the possible row an invalid left right key value pair comprising a left header and right value, a matching data type of found column's value indicative of identifying a matching data type in a column of the possible row, a missing optional column's value indicative of a missing value in an optional column in the possible row, a missing required column's value indicative of a missing value in a required column in the possible row, a partially matching data type of found column's value indicative of a partial matching data type in a column in the possible row, and a valid left right key value pair value indicative of identifying in the possible row an invalid left right key value pair comprising a left header and right value.

9. The computerized method of claim 1 wherein generating the row possibility confidence value, comprises:

generating a column confidence value for each column template in the row template; and adding the confidence value for each column template in the row template to the row possibility confidence value to generate the row possibility confidence value.

10. The computerized method of claim 1 wherein the digitized image of the document comprises a plurality of tables having the same columns and wherein bounding boxes are required to be generated only for the first table of the plurality of tables in the sample document, the method further comprising for documents in the group of similar documents, employing the bounding boxes generated for the first table of the plurality of tables in the sample document to recognize other tables having the same columns in the other documents in the group of documents.

11. The computerized method of claim 1 further comprising:

accepting user input to the sample document that identifies two or more related tables by selecting fields common to the related tables;

for documents in the group of similar documents, recognizing extracted data corresponding to the fields selected that are common to the related tables and generating a structured output file with the data extracted from the related tables positioned in the structured output file to designate the relationship between data in the related tables.

12. The computerized method of claim 1 wherein identification of only a primary column of a table header in the sample document, and identification of a first row value for any other column without the table header, is required by a user to identify columns of the table from which to extract data from tables having the same table header and same other columns, respectively, in the group of similar documents.

13. A robotic process automation system comprising:
   data storage containing a plurality of digitized images of documents, wherein at least certain of the digitized images includes one or more tables, each of the tables comprising a plurality of cells organized in one or more rows and one or more columns, each of the tables further comprising a header row;
   a processor programmed with instructions to extract information from the tables in the digitized images, the instructions when executed causing the processor to perform the operations of:
      receiving an input image comprising a portion of a digitized image of a document,
      retrieving table layout data containing information regarding a plurality of bounding boxes, wherein each bounding box delineates a rectangle surrounding data in a cell of a table in a digitized image of a sample document, each bounding box being generated by a user to the digitized image of the sample document, wherein the digitized image of the sample document contains one or more tables organized similarly to tables in the input image, the table layout data including a row template, corresponding to each table, the row template generated from bounding boxes identified for a table, the table layout data further including data class information that identifies a data type for each cell in a table;
      employing a first row template to identify a first table, corresponding to the first row template, in the input image by scanning the document from a first end to a second end, opposite the first end;
      upon detecting a possible row in the input image, generating a row possibility confidence value that indicates a likelihood that the possible row corresponds to a row in the first table;
      identifying the possible row as a row in the first table if the row possibility confidence value exceeds a predetermined threshold value; and
      if the row possibility confidence value exceeds the predetermined threshold, extracting information from each cell of the first table by scanning the first table and converting image information in each cell in the first table to data having a data type as specified by the data class information.

14. The robotic process automation system of claim 13 wherein the digitized image of the document comprises multiple pages, with more than one of the pages comprising one or more tables and wherein one or more row templates are employed to identify one or more tables, each table corresponding to a particular row template.

15. The robotic process automation system of claim 13 wherein employing a first row template to identify a first table, corresponding to the first row template, in the input image by scanning the document from a first end to a second end, opposite the first end, comprises:
   identifying a primary column, wherein the primary column comprises a column in the first table that contains a single line of data.

16. The robotic process automation system of claim 15 further comprising, after identifying the primary column:
   converting image data in a cell in the primary column to textually encoded data;
   comparing the textually encoded data to the data class information corresponding to the cell in the primary column; and
   updating the data class information if the data type for the cell in the primary column does not match the data type contained in the data class information for the cell in the primary column.

17. The robotic process automation system of claim 16 further comprising, identifying rows in each table by:
   retrieving an initial primary key corresponding to the first table;
   scanning with the initial primary key identified for the first table until a row in the first table is identified;
   if a row in the first table cannot be identified using the initial primary key, selecting another primary key corresponding to the first table and scanning the first table with the next primary key until a row in the first table is identified;
   upon identifying a row in the first table, generating a rectangle that identifies of the identified row; and
   creating row information for the identified row and storing the row information to data structure created to contain data extracted from the identified table, wherein the row information includes textually encoded information contained in each cell in the row along with coordinates defining the rectangle.

18. The robotic process automation system of claim 13 wherein generating the row possibility confidence value, comprises:
   employing a plurality of feature sets, each feature set having a weight associated therewith, the feature sets selecting from the set of feature sets comprising,
      a found column's value indicative of identifying a primary column in the possible row,
      an invalid data type value indicative of identifying in the possible row an invalid data type,
      an invalid left right key value pair value indicative of identifying in the possible row an invalid left right key value pair comprising a left header and right value,
      a matching data type of found column's value indicative of identifying a matching data type in a column of the possible row,
      a missing optional column's value indicative of a missing value in an optional column in the possible row,
      a missing required column's value indicative of a missing value in a required column in the possible row,
      a partially matching data type of found column's value indicative of a partial matching data type in a column in the possible row, and
      a valid left right key value pair value indicative of identifying in the possible row an invalid left right key value pair comprising a left header and right value.

19. The robotic process automation system of claim 13 wherein generating the row possibility confidence value, comprises:
   generating a column confidence value for each column template in the row template; and
   adding the confidence value for each column template in the row template to the row possibility confidence value to generate the row possibility confidence value.

20. A computer program product for extracting information contained in tables contained in digitized document images, the computer program product stored on a non-transitory computer readable storage medium and including instructions for causing a computer system to execute a method for extracting information from digitized images of tables, the method comprising the actions of, receiving an input image comprising a portion of a digitized image of a document from data storage containing a plurality of digitized images of documents, wherein at least certain of the digitized images includes one or more tables, each of the tables comprising a plurality of cells organized in one or more rows and one or more columns, each of the tables further comprising a header row;

retrieving table layout data containing information regarding a plurality of bounding boxes, wherein each bounding box delineates a rectangle surrounding data in a cell of a table in a digitized image of a sample document, each bounding box being generated by a user to the digitized image of the sample document, wherein the digitized image of the sample document contains one or more tables organized similarly to tables in the input image, the table layout data including a row template, corresponding to each table, the row template generated from bounding boxes identified for a table, the table layout data further including data class information that identifies a data type for each cell in a table;

employing a first row template to identify a first table, corresponding to the first row template, in the input image by scanning the document from a first end to a second end, opposite the first end;

upon detecting a possible row in the input image, generating a row possibility confidence value that indicates a likelihood that the possible row corresponds to a row in the first table;

identifying the possible row as a row in the first table if the row possibility confidence value exceeds a predetermined threshold value; and if the row possibility confidence value exceeds the predetermined threshold, extracting information from each cell of the first table by scanning the first table and converting image information in each cell in the first table to data having a data type as specified by the data class information.

\* \* \* \* \*